Oct. 12, 1965    T. H. KORELITZ ETAL    3,211,799
METHOD FOR ALKYLATION OF AROMATICS
Filed Jan. 10, 1962
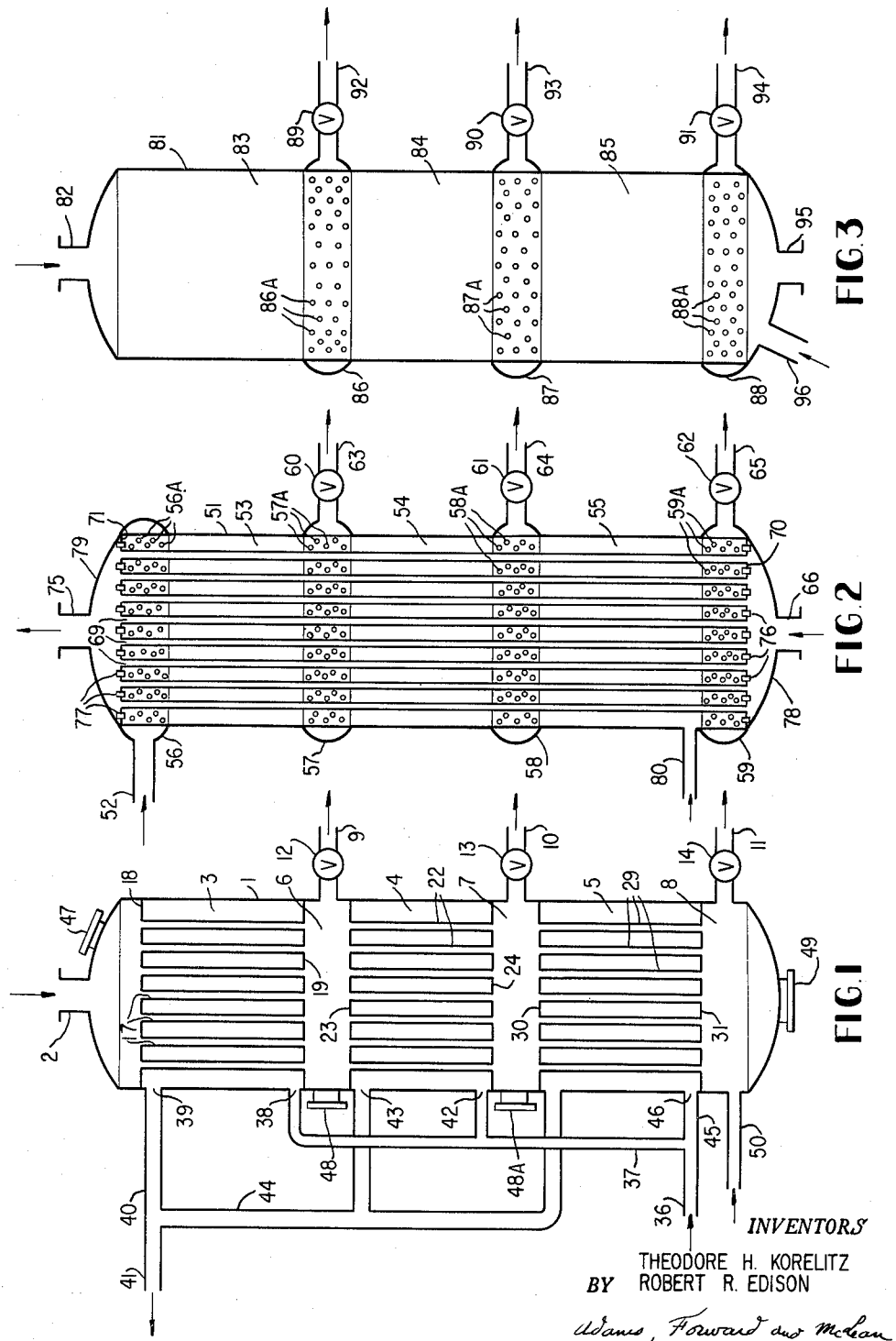
INVENTORS
THEODORE H. KORELITZ
BY ROBERT R. EDISON
ATTORNEYS 3,211,799
METHOD FOR ALKYLATION OF AROMATICS
Theodore H. Korelitz, Newton, Mass., and Robert R. Edison, Chicago Heights, Ill., assignors to Sinclair Research, Inc., Wilmington, Del., a corporation of Delaware
Filed Jan. 10, 1962, Ser. No. 165,421
1 Claim. (Cl. 260—671)

The present invention relates to a method of alkylating aromatics.

In the catalytic alkylation of aromatics to yield polyalkylated aromatics of higher carbon atom numbers than the original feed, high space velocities are generally required. Use of low space velocities is disadvantageous in that the desired reaction may reverse itself and/or the products sought may be destroyed. For instance, the alkylation reaction proceeds to equilibrium rather rapidly, forming water which, if a low space velocity or long residence time is employed, acts to deactivate the acidic sites of the solid alkylation catalyst. The alkylating agents in these reactions moreover, also cause deactivation of the catalyst. Furthermore, the alkylating agents and desired products formed tend to decompose during prolonged residence times thereby creating substantial loss of both the unreacted alkylating agent and desired product. In addition, the polyalklyated aromatic compounds are subject to coking when remaining in the reactor for a relatively long period of time. Present alkylation processes generally require frequent regeneration of the catalyst due to the substantial amounts of carbonaceous material deposited on the catalyst.

To overcome these problems, a number of small reactors, each having the desired space velocity has been employed and piping control systems have been provided in these systems by which the process stream can be switched from one reactor to another. This method, however, is complicated and expensive since interconnecting piping and control equipment are required in order to properly operate the system. Also, a substantial number of catalyst reactors are necessary in order to facilitate a continuous process. Another commonly employed method involves a large reactor with several times the desired amount of catalyst. The reactor waves then pass through the catalyst bed until the entire catalyst bed is deactivated and then the entire bed is regenerated. This method, however, is disadvantageous in that low space velocity and long residence time on catalyst result so that the aforementioned problems are created.

The present invention is directed to overcoming these problems in the catalytic alkylation of aromatics and involves passing the aromatic feed and alkylating agent in a reactor tower operating under alkylation conditions of temperature and pressure and having a plurality of alkylation catalyst beds or sections, said tower having a product outlet after each of a plurality of beds. In accordance with the process of the present invention, the product outlet means of all but the first catalyst bed are closed, for instance, by a suitable control means provided each product outlet, and the aromatic feed and alkylating agent are introduced near or at the initial end of the reactor tower and permitted to pass through the first or top catalyst bed, the product being continually withdrawn via the product outlet of this bed until the catalyst in this bed has become substantially deactivated. The product outlet of the next subsequent bed is then opened and the product outlet of the first bed closed. The aromatic feed and alkylating agent then flow downward through the initial catalyst and they are then contacted with the catalyst of the next subsequent bed, product being continually withdrawn as above via the product outlet provided this bed until the catalyst here has likewise become deactivated. This same procedure can be repeated through the remaining plurality of beds in the reactor tower. During the entire operation, inert gas can be continuously provided the subsequent catalyst bed or beds that are not in use in order to prevent reactions from taking place therein.

Although it is preferred that the process of the present invention be conducted in a reaction sequence involving first a single bed reaction zone and then progressively increasing the reaction zone by a single bed, for instance, operating first in the initial single bed, then in the first and second beds, then in the first, and second and third beds, etc., it is within the scope of the present invention to permit the desired reaction to initially take place in more than one catalyst bed or section at the same time and then increasing progressively the reaction zone by one or more beds. Thus, in its broadest aspect the present invention contemplates opening at least one of the initial catalyst beds to the desired reaction while closing off the product outlets of the remainder of the beds and after deactivation of the catalyst in this one or more catalyst beds, opening the product outlet of at least one of the subsequent beds, and then closing the product outlet provided the initial bed or beds, thereby availing one or more of the subsequent beds to the desired reactions. Thus, it can be seen that the plurality of catalyst sections within the reaction tower are operated so that only a portion of the catalyst becomes deactivated at one time. This is accomplished by controlling the flow of the reactants so that the reaction takes place in one or more catalyst beds and does not appreciably affect the remainder of the beds until operation in these sections is desired. When the subsequent product outlets are to be opened may be easily determined by following the conversion by well-known analytical methods.

The plural fixed solid, particulate catalyst bed-containing reactor of the present invention can take any desired form. For example, it can be a reactor of the isothermal type and therefore provided with a system for circulating a heat transfer medium or it can be a reactor of the adiabatic type requiring no heat transfer medium. The catalyst beds may be spaced or separated but actual separation of the beds is not required. Each catalyst section will contain sufficient catalyst to allow the high space velocity desired. Any means for the introduction and removal of catalyst can be employed.

To more fully illustrate the method of the present invention and suitable reactors that may be employed, reference is made to FIGURES 1, 2 and 3.

FIGURE 1 is a schematic diagram of the invention applied to an isothermal reactor with the catalyst in the tubes in each section.

FIGURE 2 is a schematic diagram of the invention applied to an isothermal reactor with catalyst in a bed in each section.

FIGURE 3 shows a schematic diagram of the invention as applied to an adiabatic reactor having a number of sections, each section having a catalyst bed.

Referring to FIGURE 1, orthoxylene and methanol in a 1:1 ratio are introduced via inlet 2 into an isothermal reactor having a generally cylindrical reactor shell 1. The reactor shell has a number of sections shown here as 3, 4 and 5 and is maintained under alkylation conditions of temperature and pressure. Each of the sections has an outlet chamber 6, 7 and 8, respectively. The flow of treated material through these outlets is controlled by outlet control valves 12, 13, and 14, respectively. On entry, the reactants enter the reactor shell 1 through the reactor inlet 2 and pass into section 3 and thus into catalyst tubes 17 held in tube sheets 18 and 19 and containing an alkylation catalyst such as chromia on silica-alumina held in place by a suitable screen across the tube ends. The reactants pass through the tubes and then into chamber 6, through control valve 12 and out section outlet 9. Cooling medium is supplied to the section 3 through inlet 36 up line 37 and through opening 38 into the section 3. The cooling medium is discharged out opening 39, into tube 40 and then out medium outlet 41. When the catalyst in tubes 17 in section 3 becomes deactivated, the outlet valve 13 is opened and the outlet control valve 12 is closed. The feed then passes into sections 3 and 4 through catalyst tubes 17 and 22, the latter being held in tube sheets 23 and 24, and into chamber 7, through outlet valve 13 and out section outlet 10. The cooling medium is supplied through medium inlet 36 up line 37 through opening 42 into section 4 and is discharged through opening 43, up pipe 44 to medium outlet 41.

When the catalyst in tubes 22 in section 4 becomes deactivated, outlet control valve 14 is opened and outlet control valve 13 is closed, thus the feedstock now passes into section 3, 4 and 5 and thus through catalyst tubes 17, 22 and 29, the latter being held in tube sheets 30 and 31, and into chamber 8, through outlet valve 14, and out section outlet 11. The cooling medium passes through medium inlet 36 into pipe 45 and then through opening 46 into section 5 and then to line 41 via line 44. Manways are provided at the top and bottom of each section, namely, at 47, 48, 48A and 49 to facilitate the addition and removal of catalyst materials to meet the requirements of the reactor. Inert gas is provided by line 50 at the bottom of the reactor and passes upwardly through the catalyst tubes until it reaches an open product outlet line, in order to prevent reactions from taking place in catalyst sections not in use.

FIGURE 2 describes an isothermal reactor having a general cylindrical reactor shell 51. The reactor is composed of 3 sections namely sections 53, 54 and 55, each of which contains a bed of solid, particulate alkylation catalyst and is provided with annular rings 56, 57, 58 and 59 each connected to and circumferentially arranged about the shell 51 and provided with holes 56A, 57A, 58A and 59A communicating the reactor shell 51 with the interiors of the rings. The aromatic feed and alkylating agent pass through reactor inlet 52 into the annulus of ring 56 and into section 53 containing alkylation catalyst via the communicative openings 56A. The reaction products pass out of the reactor shell 51 into the annulus of ring 57 via the communicative openings 57A and are withdrawn by way of product outlet 63 which communicates with ring 57 and contains an outlet control valve 60. The cooling medium passes into the reaction shell 51 at the bottom through inlet 66 and then through tubes 69 traversing the catalyst beds between tube sheets 70 and 71 and out of the reactor shell through heat medium outlet 75.

When the catalyst bed in the upper section 53 is deactivated, outlet control valve 61 is opened and outlet control valve 60 is closed. The feedstock now passes through the section 53 and intermediate section 54 of the reactor shell and into the annulus of ring 58 via the communicative openings 58A. The reaction products then pass through outlet valve 61 and product outlet 64. When the alkylation catalyst of the central section 54 is deactivated, control valve 62 is opened and control valve 61 is closed. The feedstock then passes through sections 53, 54 and 55 out the small openings 59A into the annulus of ring 59. The alkylate products then pass out reactor outlet 65 through control valve 62. Removal plugs 76 and 77 are provided in tube sheets 70 and 71 to enable the movement of catalyst in and out of the reactor. Access to plugs 76 and 77 is obtained by removing reactor heads 78 and 79. Inert gas is provided by line 80 near the bottom of the reactor in order to prevent reactions from taking place in sections not in use as described in connection with FIGURE 1.

FIGURE 3 is an adiabatic reactor having the catalyst in the reactor shell 81. The reactor shell has a reactor inlet 82 and catalyst-containing sections 83, 84, and 85. A circumferentially disposed annular ring similar in design to those described with reference to FIGURE 2 is provided at the bottom of each of catalyst-containing sections 83, 84 and 85. Communicative openings 86A, 87A and 88A are provided the ring and shell as described in FIGURE 2. The feedstock passes through the reactor inlet 82 and into the upper section 83 having a catalyst bed. The reaction products pass via the communicative openings 86A into the annulus of ring 86 and are withdrawn through product outlet 92 containing outlet control valve 89. When the catalyst in the upper section 83 becomes deactivated the outlet control valve 90 is opened and the outlet control valve 89 is closed. The feed then passes through the upper section 83 into center section 84 having a catalyst bed and then out the openings 87A in the reactor shell into annulus 87. The alkylation product is withdrawn by way of product outlet 93 containing valve 90. When the catalyst in the upper and central sections of the shell becomes deactivated, the outlet control valve 91 is opened and outlet control valve 90 is closed. The feedstock then passes through sections 83 and 84 into section 85 containing fresh catalyst. The reaction products then pass out the openings 88A in the shell into annulus 88 and are withdrawn by means of product outlet 94. The deactivated catalyst is removed through nozzle 95 at the base of the shell. Catalyst is added to the catalyst bed through the reactor feed opening 82. Line 96 continuously feeds a small amount of inert gas to prevent reactions from taking place in sections not in use as described above.

Thus, by means of the present invention, the desired space velocity can be obtained without the disadvantage of a large number of small reactors, intricate controls and interconnecting pipes. Also, the loss of treating agents and reaction products can be minimized. Catalyst poisoning due to stream can also be minimized. Since, in the apparatus of this invention, the catalyst sections are contained in a single shell, the capital expenditure, maintenance costs, and space requirements are lower than those normally required with multiple reactor systems. The time between catalyst regenerations and recharging in each multiple section reactor would be much longer than in the conventional multiple reactor systems, indicating smaller upkeep and reduced operating expenses.

The catalyst of the present invention can be any suitable alkylation catalysts known in the art, for instance, the catalyst can be silica based, including synthetic gel type catalysts as, for example, those disclosed in U.S. Patents Nos. 2,384,505 and 2,542,190, and clay catalysts. The silica-based catalyst can include solid metal oxide or mixed solid oxides of metals or non-metals, as, for instance, the metal oxides of Group VI and VIII. Alumina-silica based catalysts represent the preferred group of catalysts because of their low cost, regenerability, high rate of conversion obtained, and their stability at the operating conditions employed. It is preferred that the silica-alumina contain at least about 50% silica, up to about 95% silica.

The alkylation reactions used in the process of the present invention generally include a temperature in the range of about 400–1000° F., preferably from 500–800° F., while the pressure may range from about ambient pressures or less up to about 2000 p.s.i.g., e.g. about 0–2000 p.s.i.g. and at preferably elevated pressures ranging from about 50–1000 p.s.i.g. The hydrocarbon space velocity in each section will in most cases be from about 1–10 preferably from about 2 to 5 weights of aromatic hydrocarbon per weight of catalyst per hour (WHSV). The alkylating agent is usually employed in a molar ratio to the aromatic of about 1 to 4:1 and preferably about 1–2:2. Diluent gases, e.g. inert or hydrocarbon, such as $H_2$, $N_2$ and $CH_4$ can be utilized in the alkylation process usually in the amounts ranging from a diluent gas to alkylating agent molar ratio from about 0.01–20:1 or more, preferably about 2–10:1.

The aromatics subjected to alkylation are alkylatable aromatic hydrocarbons and include mono- and polycyclic aromatic hydrocarbon compounds such as benzene and its lower alkyl homologues, e.g. toluene and the xylenes, naphthalene, and indane, which may be substituted or unsubstituted. The substituted aromatic compounds must, however, contain at least 1 hydrogen attached to the aromatic nucleus and are preferably methyl substituted. These compounds may correspond to the general formula of

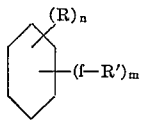

where R is an alkyl, including cyclo alkyl, radical containing generally from about 1 to 20, preferably from about 1 to 8, carbon atoms; $n$ is 0–5, preferably 1–3; R' is an aromatic hydrocarbon ring, preferably $C_4H_4$; —f— indicates a fused ring relationship (two carbon atoms common to two aromatic nuclei, e.g. as in naphthalene); and $m$ is generally 0 to 1 or more. R may also be a divalent hydrocarbon group attached to the aromatic ring at two carbon atoms of the ring, e.g. alkylene, as in decalin and tetralin. The preferred aromatics, however, include benzene and alkyl benzenes corresponding to the above formula when $m$ is 0. The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethyl-benzene, ortho-ethyltoluene, meta-ethyltoluene, para-ethyltoluene, 1,2,3-trimethylbenzene, 1,2,4-trimethylbenzene, 1,3,5-trimethylbenzene or mesitylene normal propylbenzene, isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha-methylnaphthalene, beta-methylnaphthalene, anthracene, phenanthrene, naphthacene, rubrene, etc.

The alkylating agents suitable for use in the present process include organic compounds containing an alkyl, including cycloalkyl, radical which is transferable to the aromatic nucleus. These compounds are aliphatic and include alkyl halides, alkanols and ethers generally containing from about 1 to 20 carbon atoms, preferably from about 1 to 6 carbon atoms, and also contain a radical, e.g. an hydroxyl or ether radical, which will displace a nuclear hydrogen of the aromatic through condensation. The alkylation agent is preferably saturated and frequently contains oxygen which produces water during the alkylation reaction.

A number of suitable alkylating agents correspond to the general formula

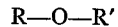

R—O—R' where R is a monovalent hydrocarbon radical such as alkyl, including cycloalkyl, usually lower alkyl and preferably containing 1 to 4 carbon atoms and R' is hydrogen or R, such as a lower alkyl radical and preferably containing 1 to 4 carbon atoms. The alkylating agents usually do not have more than about 18 carbon atoms, preferably up to about 12 carbon atoms. Specific alkylating agents include alkanols such as ethanol, propanol, isopropanol, pentanol, octanol and preferably methanol; and alkyl ethers such as dimethyl ether, diethyl ether and like members whether substituted with non-interferring groups or not. When the alkanols are employed, they may go through an intermediate ether stage. Examples of alkyl halides which may be used are of the formula RX, where R is as noted above and X is halogen and include ethyl chloride, normal propyl chloride, isopropyl chloride, normal butyl chloride, isobutyl chloride, secondary butyl chloride, tertiary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

To further illustrate the present invention, the following example is included.

*Example I*

A mixed xylene feed and methanol in a mole ratio of approximately 3.5:1 and hydrogen are heated to 700° F. and introduced into the isothermal reactor of FIG. 2 except that it contains six catalyst sections instead of three, each containing a product outlet as described above with reference to FIG. 2. The catalyst employed in each section consists essentially of 10% Cr, 10% boria on alumina. The alkylation conditions maintained in each of the catalyst sections are as follows:

| | |
|---|---|
| Temperature | 700° F. |
| Pressure | 420 p.s.i.g. |
| Arom. WHSV | 4.0. |
| MeOH/arom. mol ratio | 0.5/1. |
| $H_2$/arom. mol ratio | 7/1. |

On introduction of the xylene feed and methanol, the product outlet 63 of the top section 53 is open and all subsequent product outlets closed. Alkylation is conducted in section 53 for approximately 12 hours, alkylation effluent being continually withdrawn, after which the subsequent product outlet 64 is opened and product outlet 63 closed. Alkylation then continues in sections 53 and 54, for approximately 12 hours, product being continually withdrawn via product outlet 64. This same procedure is repeated throughout the remaining 4 catalyst sections. Nitrogen is continually introduced into the last catalyst bed until that bed is on-stream. The total processing time is about 3 days.

We claim:

A process for alkylating an alkylatable aromatic with a water-producing alkylating agent in a reactor provided with a plurality of sections, each containing alkylation catalyst and a product outlet, which comprises closing all product outlet subsequent to the product outlet of an initial catalyst section and passing said aromatic and alkylating agent to the initial catalyst section of said reactor, removing product by way of the product outlet of said initial section until the catalyst in said section is substantially deactivated, opening the product outlet of a subsequent catalyst section, closing the product outlet of said initial section so that the aromatic feed and alkylating agent contact said subsequent catalyst section, and withdrawing product by way of the product outlet of said subsequent catalyst section until the catalyst in this section is substantially deactivated, the operation being conducted with introduction of inert gas into the subsequent catalyst section during its time of non-use to prevent reaction therein.

References Cited by the Examiner

UNITED STATES PATENTS

| | | | |
|---|---|---|---|
| 2,323,830 | 7/43 | McMillan | 260—683.75 |
| 2,400,437 | 5/46 | Perkins et al. | 260—671 |
| 2,589,523 | 3/52 | Woertz et al. | 260—671 X |
| 2,787,648 | 4/57 | King | 260—671 |

ALPHONSO D. SULLIVAN, *Primary Examiner.*